US012801739B2

(12) United States Patent
Ikuse et al.

(10) Patent No.: US 12,801,739 B2
(45) Date of Patent: Nov. 17, 2026

(54) PROVER DEVICE, VERIFIER DEVICE, AND REMOTE ATTESTATION SYSTEM

(71) Applicant: DENSO CORPORATION, Kariya-city (JP)

(72) Inventors: Tomonori Ikuse, Kariya-city (JP); Takeshi Nakamura, Kariya-city (JP); Yasuharu Sugano, Kariya-city (JP); Carlos Mora-Golding, Southfield, MI (US); Ameer Kashani, Southfield, MI (US)

(73) Assignee: DENSO CORPORATION, Kariya-city (JP)

( * ) Notice: Subject to any disclaimer, the term of this patent is extended or adjusted under 35 U.S.C. 154(b) by 192 days.

(21) Appl. No.: 18/644,214

(22) Filed: Apr. 24, 2024

(65) Prior Publication Data

US 2025/0335567 A1 Oct. 30, 2025

(51) Int. Cl.
*G06F 21/56* (2013.01)
*G06F 21/57* (2013.01)

(52) U.S. Cl.
CPC ............ *G06F 21/565* (2013.01); *G06F 21/57* (2013.01)

(58) Field of Classification Search
CPC ................................ G06F 21/565; G06F 21/57
See application file for complete search history.

(56) References Cited

U.S. PATENT DOCUMENTS

2011/0138188 A1* 6/2011 Lee ......................... G06F 21/57 713/187
2017/0295020 A1* 10/2017 Moulin ................... G06F 21/64
2018/0276374 A1* 9/2018 Baldwin ................. G06F 21/53
2019/0155743 A1* 5/2019 Loreskar ............... G06F 21/575
2020/0134181 A1* 4/2020 Boutnaru .............. G06F 21/552
2021/0064754 A1* 3/2021 Bursell ................. H04L 9/3242
2021/0271751 A1* 9/2021 Fu ........................... G06F 21/57
2022/0300606 A1* 9/2022 Veettikattil ............. G06F 21/54
(Continued)

FOREIGN PATENT DOCUMENTS

EP 3229164 A1 10/2017

OTHER PUBLICATIONS

Nilsson, Dennis K.; Sun, Lei; Nakajima, Tatsuo; "A Framework for Self-Verification of Firmware Updates over the Air in Vehicle ECUs," Globecom Workshops, New Orleans, LA, USA, Nov. 30-Dec. 4, 2008, IEEE, pp. 1-5.*
(Continued)

*Primary Examiner* — Victor Lesniewski
(74) *Attorney, Agent, or Firm* — Harness, Dickey & Pierce, P.L.C.

(57) ABSTRACT

A prover device that places software in a memory and executes the software determines placement information indicating a position in the memory at which the software is placed; corrects a reference position included in the software based on the placement information; places the software, in which the reference position has been corrected, at a position in the memory based on the placement information and executes the software; transmits the placement information to a verifier device; receives a measurement instruction from the verifier device; reads the software placed in the memory and calculates a hash value, based on the measurement instruction; and transmits the hash value to the verifier device.

21 Claims, 11 Drawing Sheets

(56) References Cited

U.S. PATENT DOCUMENTS

| | | | | |
|---|---|---|---|---|
| 2022/0366087 | A1* | 11/2022 | Burenkov | G06F 21/57 |
| 2023/0333964 | A1* | 10/2023 | Kneib | G06F 11/3612 |
| 2023/0409316 | A1* | 12/2023 | Aiba | B60R 16/02 |
| 2024/0086541 | A1* | 3/2024 | Kishikawa | G06F 21/57 |
| 2024/0134987 | A1* | 4/2024 | Kaster | H04L 63/126 |
| 2024/0176632 | A1* | 5/2024 | Yang | G06F 9/45508 |
| 2024/0419795 | A1* | 12/2024 | Lu | G06F 21/64 |
| 2025/0097051 | A1* | 3/2025 | Luo | H04L 9/40 |

OTHER PUBLICATIONS

Xie, Jia; Zhang, Bin; Feng, Chao; Tang, Chaojing; "An Automatic Evaluation Approach for Binary Software Vulnerabilities with Address Space Layout Randomization Enabled," International Conference on Big Data Analysis and Computer Science (BDACS), Kunming, China, Jun. 25-27, 2021, IEEE, pp. 170-174.*

Seo et al., "SGX-Shield: Enabling Address Space Layout Randomization for SGX Programs", pp. 1-15.

* cited by examiner

FIG. 6

| Contents ID | VIN | ECU ID | Software/Data ID | RAW data |
|---|---|---|---|---|
| 1 | XXX | TCU0 | AAA | 7f454c4602010100 … |
| 2 | YYY | TCU0 | BBB | 7f454c4602010100 … |
| … | | | | |

FIG. 7

| Contents ID | Allocation ID | Timestamp | Placement information | Trust chain value |
|---|---|---|---|---|
| 1 | 1 | 2021-05-08 09:05:00 UTC | 0x0005a000 | A94a8fe5ccb19ba61c4c… |
| 1 | 2 | 2021-05-08 12:10:00 UTC | 0x000fb000 | 112beb2abced2693a3e5… |
| … | … | | | |

FIG. 8

| Request ID | Timestamp | Contents ID | Nonce | data 1 | data 3 | data 2 |
|---|---|---|---|---|---|---|
| 1 | 2021-05-08 10:05:00 UTC | 1 | be38ef7c … | 134283264, 4096 | 134291456, 4096 | 134287360, 4096 |
| 2 | 2021-05-08 13:05:00 UTC | 1 | 894f4f83 … | | | |
| … | | | | | | |

FIG. 9

| Result ID | Request ID | Timestamp | Hash value |
|---|---|---|---|
| 1 | 1 | 2021-05-08 10:05:30 UTC | h1, h2, h3 |
| 2 | 2 | 2021-05-08 13:05:30 UTC | |
| ... | ... | | |

PROVER DEVICE, VERIFIER DEVICE, AND REMOTE ATTESTATION SYSTEM

TECHNICAL FIELD

The present disclosure relates to a remote attestation system in which the integrity of software executed primarily on a prover device is verified by a verifier device, and to the prover device and the verifier device constituting the system. As an example, the present disclosure relates to a remote attestation system in which all or some of devices constituting the system are mounted in a vehicle.

BACKGROUND

In recent years, various electronic control devices connected through in-vehicle networks are mounted in automobiles, and software is executed in each electronic control device. However, there is a possibility that such software may be falsified by a cyberattack or the like due to being compromised, causing the software to operate differently from the original plan. To address these issues, the use of remote attestation is being considered. Remote attestation is a mechanism that can confirm the health of a device or software on the device during remote operation or the like for the purpose of device management and operation.

However, when other security technologies are introduced, coexistence with remote attestation is problematic. For example, when a device is to introduce address space layout randomization (ASLR), which is a technique for randomizing a memory layout, to mitigate vulnerability, the integrity of software on the device cannot be verified unless the remote side knows in advance what memory layout is adopted.

In view of such a difficulty, mechanisms described in first and second related techniques have been proposed.

SUMMARY

A prover device that places software in a memory and executes the software determines placement information indicating a position in the memory at which the software is placed; corrects a reference position included in the software based on the placement information; places the software, in which the reference position has been corrected, at a position in the memory based on the placement information and executes the software; transmits the placement information to a verifier device; receives a measurement instruction from the verifier device; reads the software placed in the memory and calculates a hash value, based on the measurement instruction; and transmits the hash value to the verifier device.

BRIEF DESCRIPTION OF THE DRAWINGS

The objects, features and advantages of the present disclosure will be more clearly understood from the following detailed description with reference to the accompanying drawings. In the accompanying drawings:

FIG. 6 is an explanatory diagram illustrating information stored in advance in the storage unit of the verifier device;

FIG. 7 is an explanatory diagram illustrating placement information and the like transmitted from the prover device to the verifier device;

FIG. 8 is an explanatory diagram illustrating a measurement instruction transmitted from the verifier device to the prover device;

FIG. 9 is an explanatory diagram illustrating a hash value transmitted from the prover device to the verifier device;

DETAILED DESCRIPTION

Figure 1A:
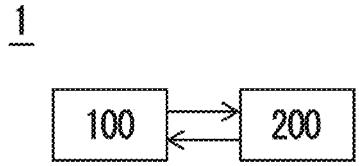
FIG. 1A to FIG. 1C are explanatory diagrams illustrating an arrangement of a prover device, a verifier device, and a remote attestation system.

As a result of detailed studies, the inventor of the present application has found the following difficulties.

In the first related technique, a device that is a prover actively obtains a measurement value, includes the measurement value in a measurement log, and transmits the measurement value to a device that is a verifier, so that the measurement value does not necessarily match a target that the device that is a verifier needs to verify.

In the second related technique, the memory layout is randomized within the Enclave before the launch of the Enclave. However, the measurement result obtained before the launch of the Enclave is used during the execution of remote attestation, and hence the integrity during the execution of the Enclave cannot be verified.

The present disclosure provides a prover device, a verifier device, and a remote attestation system capable of executing remote attestation on a target required by a verifier even after memory layout has been randomized.

According to one aspect of the present disclosure, a prover device that places software in a memory and executes the software, the prover device includes:

- a placement position determination unit that determines placement information indicating a position in the memory at which the software is placed;
- a reference position correction unit that corrects a reference position included in the software based on the placement information;
- a launch processing unit that places the software, in which the reference position has been corrected, at a position in the memory based on the placement information, and executes the software;
- a placement information transmission unit that transmits the placement information to a verifier device;
- a measurement instruction reception unit that receives a measurement instruction from the verifier device;
- a measurement unit that reads the software placed in the memory and calculates a hash value, based on the measurement instruction; and a measurement result transmission unit that transmits the hash value to the verifier device.

According to one aspect of the present disclosure, a verifier device that verifies integrity of software executed by a prover device, the verifier device includes:

a placement information reception unit that receives, from the prover device, placement information indicating a position in a memory of the prover device at which the software is placed;

a storage unit that stores the placement information received;

a measurement instruction generation unit that generates a measurement instruction to instruct calculation of a hash value of the software executed by the prover device;

a measurement instruction transmission unit that transmits the measurement instruction to the prover device;

a measurement result reception unit that receives a first hash value that is a response to the measurement instruction;

a reference position correction unit that reads master software stored in the storage unit and corrects a reference position included in the master software based on the placement information;

a measurement unit that calculates a second hash value of the master software in which the reference position has been corrected; and a verification unit that verifies whether the first hash value matches the second hash value.

With the above configuration, the prover device, verifier device, and remote attestation system of the present disclosure can execute remote attestation on a target required by the verifier even after the memory layout has been randomized.

Hereinafter, embodiments of the present disclosure will be described with reference to the drawings.

The effects described in an embodiment are effects in the case of having the configuration of the embodiment as an example of the present disclosure, and not necessarily the effects of the present disclosure.

When there are a plurality of embodiments (including modifications, as the same applies hereinafter in this section), the configuration disclosed in each embodiment is not limited to that embodiment alone, but can be combined across embodiments. For example, the configuration disclosed in one embodiment may be combined with another embodiment. The configurations disclosed respectively in a plurality of embodiments may be collected and combined.

Premise of Each Embodiment (Arrangement of Prover Device 100, Verifier Device 200, and Remote Attestation System 1)

Figure 1B:
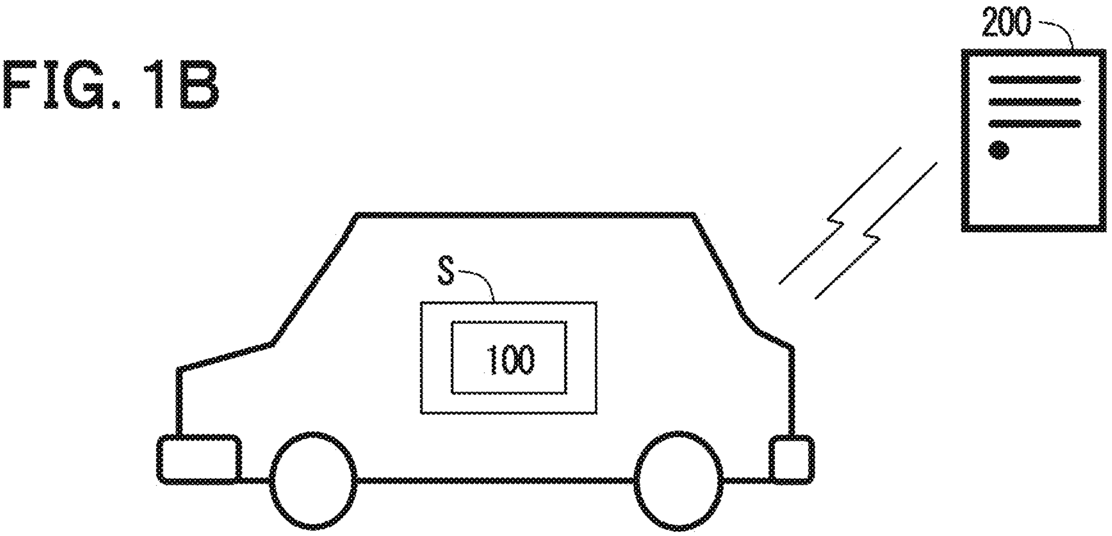
Figure 1C:
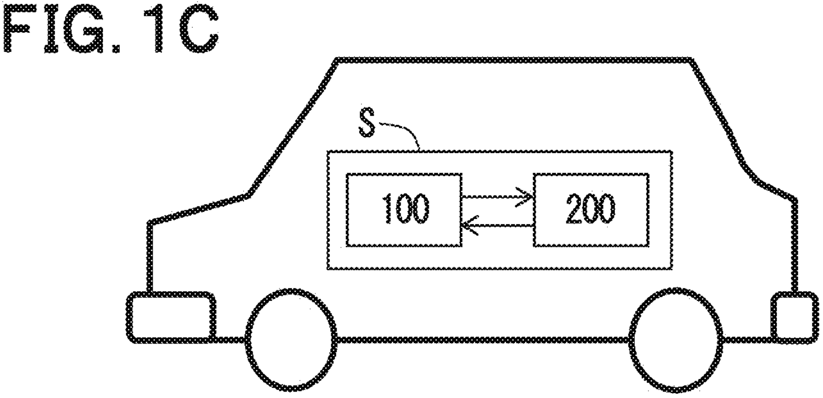

FIG. 1A to FIG. 1C are diagrams illustrating the arrangement of a prover device 100, a verifier device 200, and a remote attestation system 1. First, an outline of each device and a connection method will be described with reference to FIG. 1A.

The prover device 100 is a device that places "software" in a "memory" and executes the software. This device is a device that is a target for proving the integrity of the software executed, that is, a device that provides evidence information for proving its own integrity. Therefore, the device is referred to as a prover device.

The verifier device 200 is a device that verifies the integrity of "software" executed by the prover device 100, that is, a device that verifies the integrity of the prover device based on the evidence information received from the prover device. Therefore, the device is referred to as a verifier device.

The prover device 100 and the verifier device 200 are collectively referred to as the remote attestation system 1.

Here, the "software" includes not only a case where the software is made up of program code and data but also a case where the software is made up of only program code or only data.

For the "memory", a position-identifiable readable/writable storage medium is sufficient, which may include non-volatile memory such as a flash memory or a hard disk, in addition to volatile memory such as random-access memory.

The prover device 100 and the verifier device 200 are connected using a wired communication method or a wireless communication method to transmit and receive placement information, a measurement instruction, a hash value, and the like, which will be described later.

Examples of the wired communication method include the Internet, a fixed telephone line, and Ethernet (registered trademark). When an in-vehicle network is used, a controller area network (CAN) or a local interconnect network (LIN) can be used.

Examples of the wireless communication method include IEEE802.11 (Wi-Fi (registered trademark)), IEEE802.16 (WiMAX (registered trademark)), wideband code division multiple access (W-CDMA), high-speed packet access (HSPA), long-term evolution (LTE), long-term evolution advanced (LTE-A), fourth generation (4G), fifth generation (5G), and the like. In addition, dedicated short-range communication (DSRC), Bluetooth low energy (BLE), or Bluetooth (registered trademark) may be used.

As to which communication method to use, an optimal communication method can be adopted according to the positions at which the prover device 100 and the verifier device 200 are installed, a distance therebetween, and other factors.

The placement positions of the prover device 100 and the verifier device 200 are arbitrary. That is, the positions of the prover device 100 and the verifier device 200 and the distance between the prover device 100 and the verifier device 200 are arbitrary.

For example, as illustrated in FIG. 1B, the prover device 100 may be mounted in a vehicle, and the verifier device 200 may be provided outside the vehicle. For example, the prover device 100 may be an "electronic control device" (electric control unit, ECU) "mounted" in a vehicle that is a "moving object", and the verifier device 200 may be a server device installed outside the vehicle that is the "moving object". That is, the prover device 100 is located inside an electronic control system S, and the verifier device 200 is located outside the electronic control system S. The electronic control device is a device constituting the electronic control system of the vehicle. In this case, the prover device 100 and the verifier device 200 are connected by, for example, Wi-Fi or 5G.

Alternatively, as illustrated in FIG. 1C, both the prover device 100 and the verifier device 200 may be mounted in the vehicle. For example, the prover device 100 may be an "electronic control device" "mounted" in the vehicle that is the "moving object", and the verifier device 200 may be another "electronic control device" "mounted" in the vehicle that is the "moving object". That is, both the prover device 100 and the verifier device 200 are located inside the electronic control system S. In this case, the prover device 100 and the verifier device 200 are connected by Ethernet or CAN.

In addition, both the prover device 100 and the verifier device 200 may be provided outside the vehicle, regardless of which vehicle.

Here, the "moving object" refers to a movable object, and a moving speed is arbitrary. Naturally, a case where the moving object is stopped is also included. Examples thereof include, but are not limited to, an automobile, a motorcycle, a bicycle, a pedestrian, a ship, an aircraft, and an object mounted therein.

The term "mounted" includes not only a case where the device is directly fixed to the moving object but also a case where the device is not fixed to the moving object but moves together with the moving object. Examples thereof include a case where a person on the moving object carries the device and a case where the device is mounted in a load placed on the moving object.

The "electronic control device" may be a virtualized electronic control device implemented using virtualization technology, in addition to a physically independent electronic control device.

In each embodiment to be described later, a description will be given on the premise of the arrangement of FIG. 1B or FIG. 1C.

First Embodiment (Configuration of Prover Device 100)

Figure 2:
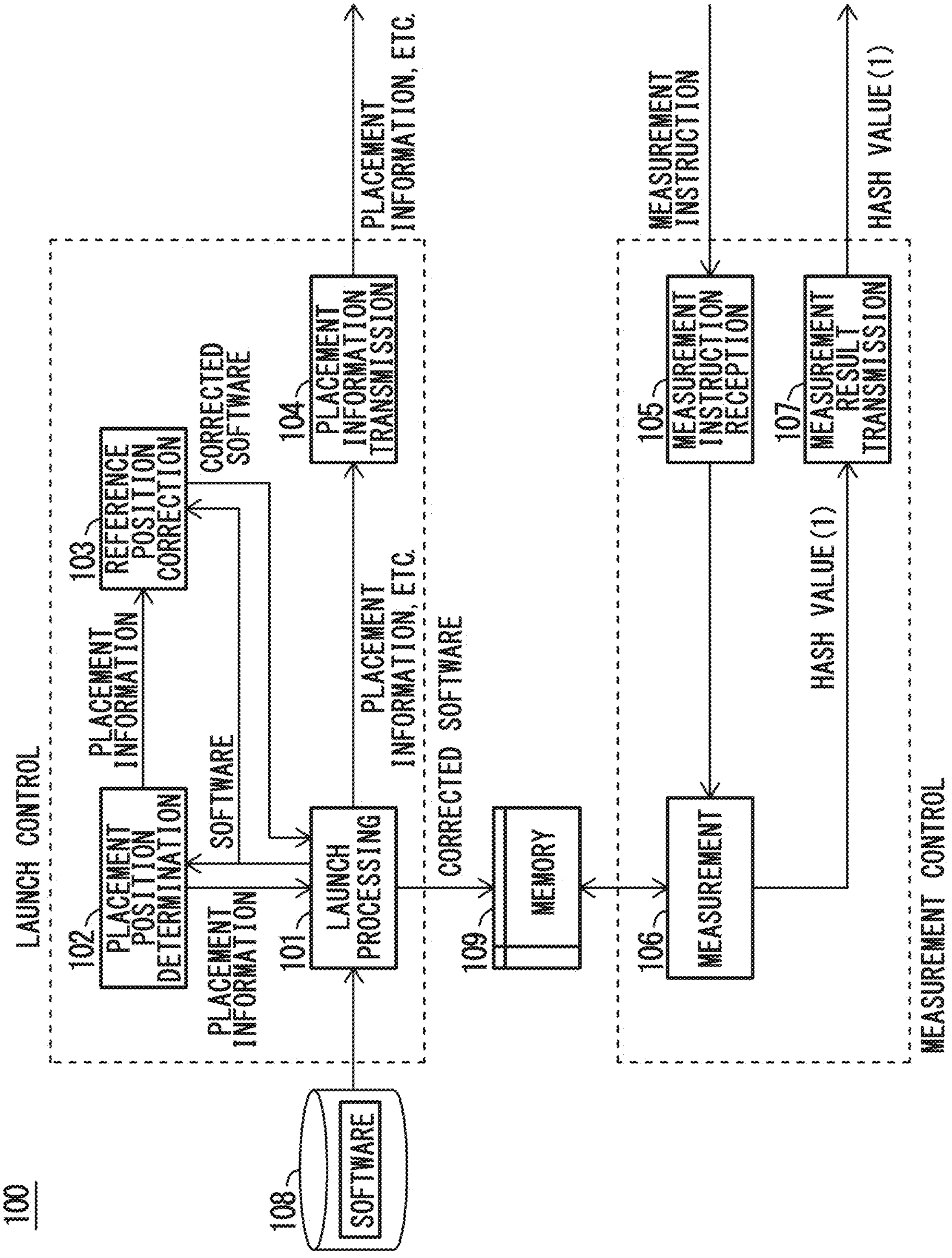
FIG. 2 is a block diagram illustrating a configuration example of a prover device according to each of first and second embodiments.

A configuration example of the prover device 100 according to the present embodiment will be described with reference to FIG. 2. The prover device 100 includes a launch processing unit 101, a placement position determination unit 102, a reference position correction unit 103, a placement information transmission unit 104, a measurement instruction reception unit 105, a measurement unit 106, a measurement result transmission unit 107, a storage unit 108, and a memory 109.

The prover device 100 can be divided into a launch control unit related to software launch and a measurement control unit related to software measurement. In FIG. 2, the launch control unit is a range including the launch processing unit 101, the placement position determination unit 102, the reference position correction unit 103, and the placement information transmission unit 104. The measurement control unit is a range including the measurement instruction reception unit 105, the measurement unit 106, and the measurement result transmission unit 107.

The prover device 100 can include a general-purpose central processing unit (CPU), volatile memory such as random-access memory (RAM), nonvolatile memory such as read-only memory (ROM), flash memory, or a hard disk, various interfaces, and internal bus that connects these components. By executing software on these pieces of hardware, it is possible to perform the function of each functional block illustrated in FIG. 2. The same applies to the verifier device 200 to be described later.

The launch processing unit 101 is a module that places software in the memory 109 and executes the software. However, since the placement position of the software in the memory 109 is determined by the placement position determination unit 102 in the present embodiment, the launch processing unit 101 first reads the software from the storage unit 108 and outputs the read software to the placement position determination unit 102 and the reference position correction unit 103.

The placement position determination unit 102 determines placement information indicating a position in the memory 109 at which the software output by the launch processing unit 101 is placed. When the memory is a random-access memory (RAM), the placement information is, for example, a start address indicating the leading position of the software and the size of the software. The size of the software may be omitted when the size of the software is known in the verifier device 200. Alternatively, a start address indicating the leading position and an end address indicating the trailing position may be used.

The placement position determination unit 102 returns the determined placement position to the launch processing unit 101 and outputs the placement position to the reference position correction unit 103.

A plurality of pieces of placement information may be provided. For example, a base address of an execution file body and a base address of a library may be determined separately.

In the present embodiment, the placement position determination unit 102 randomly determines the placement position of the software in the memory 109. Examples of the target to be randomly determined include units of files, functions, and bytes, but the target is not limited thereto. As an example other than the random determination, the placement position may be determined according to a predetermined rule. Examples of such a determination include a case where the placement position is selected from the placement position candidate list and a case where the placement position is determined by a predetermined calculation based on the date and time when the software is executed.

Based on the placement information determined by the placement position determination unit 102, the reference position correction unit 103 corrects the "reference position" included in the software. The reference position correction unit 103 returns the software, in which the reference position has been corrected, to the launch processing unit 101.

Here, the "reference position" is a position in the memory referenced on the program, and it is sufficient if the address of the referenced memory can be directly or indirectly identified.

Figure 3:
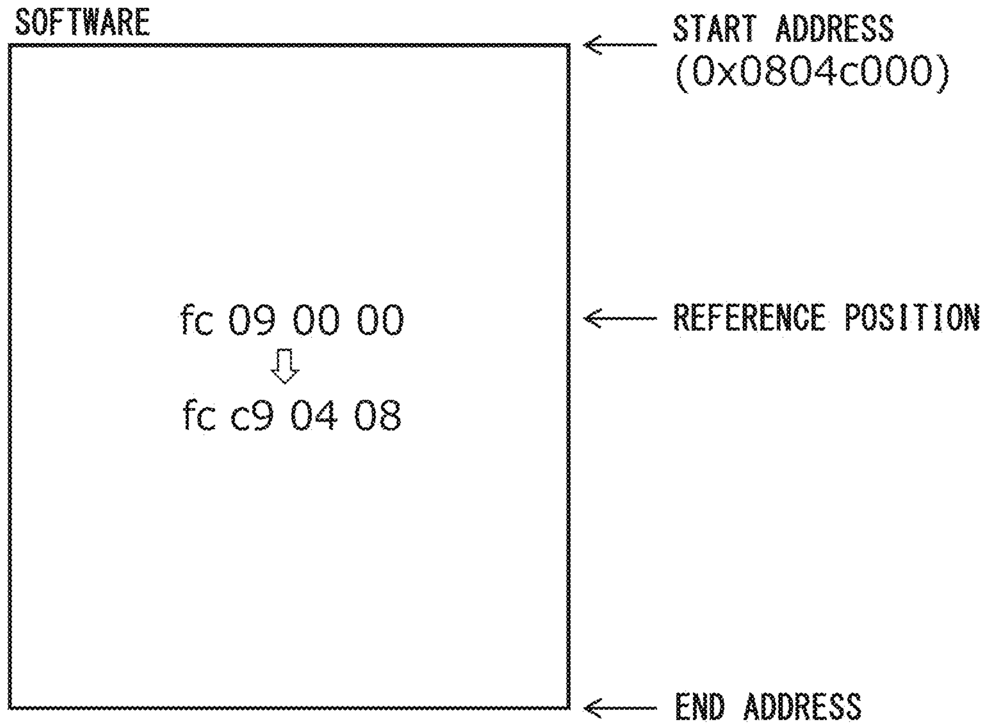
FIG. 3 is an explanatory diagram illustrating processing contents of a reference position correction unit according to each embodiment.

Specific processing contents of the reference position correction unit 103 will be described with reference to FIG. 3. A case where the placement position determination unit 102 determines the start address, which is the placement information of the target software, as 0x0804c000 will be considered. In this case, the reference position correction unit 103 extracts the reference position included in the software and adds the placement information thereto to modify the reference position. For example, when the reference position included in the software is fc 09 00 00, by adding 08 04 c0 00, which is the placement information, the reference position is modified to fc c9 04 08.

As a result, even when the reference position depends on the position of the software in the memory, the reference position can be modified so that the software can be executed correctly.

Based on the placement information determined by the placement position determination unit 102, the launch processing unit 101 places the software, in which the reference position has been corrected by the reference position correction unit 103, in the memory and executes the software. The launch processing unit 101 outputs the placement information to the placement information transmission unit 104.

The placement information transmission unit 104 transmits the placement information to the verifier device 200. The timing for transmitting the placement information is arbitrary. Examples thereof include a case where the prover device 100 actively transmits the placement information, that is, by a trigger from the prover device 100 itself or from a device other than the verifier device 200, and a case where the prover device 100 passively transmits the placement information, that is, by a trigger from the verifier device 200. In the present embodiment, a case where the former operation is performed will be described, and in a second embodiment, a case where the latter operation is performed will be described.

In the present embodiment, the placement information transmission unit 104 transmits the placement information to the verifier device 200 when the launch processing unit 101 launches the software.

In addition, the placement information may be transmitted when a security sensor provided in the vehicle and connected to the prover device 100 detects an abnormality, or when security information and event management (SIEM) provided in the vehicle detects a cyberattack, that is, when it is determined that there is a high possibility of a cyberattack. In this case, since there is a risk that the software executed by the prover device 100 has been compromised, the verifier device 200 can confirm the integrity of the software by using the transmission of the placement information as a trigger to proceed with the verification.

The placement information may also be transmitted when the power supply is turned off in the electronic control system or electronic control devices including the prover device 100. In this case, the integrity of the software can be checked before the power supply is turned off.

In any of the cases, the placement information transmission unit 104 transmits the placement information to the verifier device 200 prior to the calculation of a hash value by the measurement unit 106 to be described later.

The placement information transmission unit 104 may transmit, in addition to the placement information, a trust chain value that is a hash value obtained from a program executed in the boot sequence of the prover device 100 and a setting file referenced by the program. Thereby, the verifier device 200 can verify that the prover device 100 has been booted normally and determine whether to store the received placement information based on the verification result.

The hash value used as the trust chain value is calculated from a series of executed programs (e.g., BIOS, UEFI, boot loader, OS, etc.) and a referenced setting file. At this time, the trust chain value is calculated by calculating hash values in a sequential manner to form a hash chain. With such a configuration, when any file (program or setting file) is changed, the trust chain value also changes. Thus, the integrity of a series of program codes and the referenced setting file can be verified by verifying whether the trust chain value is the same as the expected value.

Along with the placement information, a contents identifier (Contents ID) that identifies the executed software, a vehicle identifier (VIN) that can identify the vehicle, an identifier (Program/Data ID) that identifies a program or data included in the executed software, a process identifier (PID), a process name (Process Name), and a time (Timestamp) when the placement position determination unit 102 determined the placement of the software may be transmitted. Which specific information is transmitted will be described later with reference to FIG. 6.

The prover device 100 may transmit the software itself executed by the prover device 100 in addition to the placement information and the like.

The measurement instruction reception unit 105 receives a measurement instruction generated by the verifier device 200 from the verifier device 200. In the present embodiment, the measurement instruction includes "measurement region information" indicating a region to be measured in the software.

Here, the "measurement region information" may be any information that can identify a part of the software in the memory, and examples thereof include the address of the memory and the size of the software.

Figure 4A:
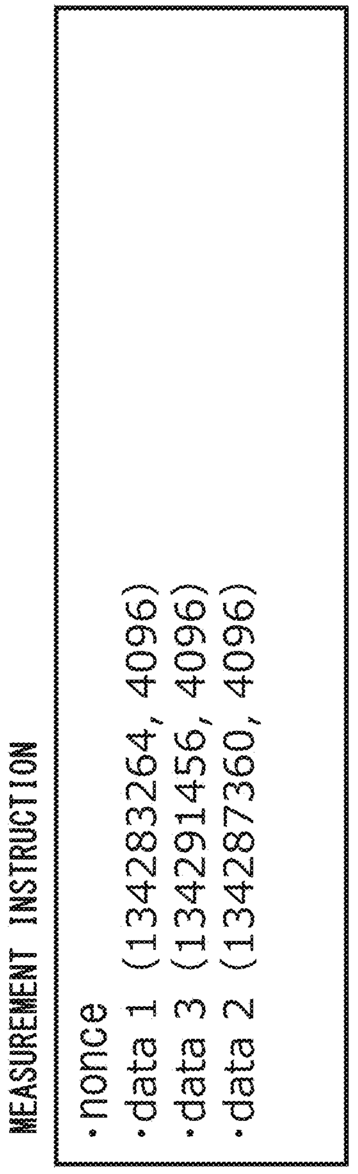
FIG. 4A and FIG. 4B are explanatory diagrams illustrating a measurement instruction received by a measurement instruction reception unit and processing contents of a measurement unit.

A specific example of the measurement instruction received by the measurement instruction reception unit 105 will be described with reference to FIG. 4A and FIG. 4B. In the case of FIG. 4A, the received measurement instruction includes three regions as measurement region information in addition to a nonce. The first region is indicated by data1, with a start address of 134283264 (decimal notation), and a size of 4096 bytes. The second region is indicated by data3, with a start address of 134291456 (decimal notation), and a size of 4096 bytes. A third region is indicated by data2, with a start address of 134287360 (decimal notation), and a size of 4096 bytes.

This measurement instruction also includes an instruction to execute measurement in the order of data1, data3, and data2. That is, the order of data1, data3, and data2 corresponds to the measurement order information.

The nonce is, for example, a random number generated by the verifier device 200, but may also be any numerical value with low predictability, even if not completely random.

The measurement unit 106 reads the software placed in the memory 109 and calculates a "hash value" based on the measurement instruction received by the measurement instruction reception unit 105.

Here, the "hash value" is an output value itself calculated by a function that calculates a unique value for an input value, or a value obtained by performing processing such as encryption on the output value, and an algorithm used for the function is arbitrary. For example, the "hash values" include not only a value calculated by a one-way hash function such as SHA512 but also a value calculated by a cipher-based MAC (CMAC), a value calculated by a hash-based MAC (HMAC), and a signature.

Figure 4B:
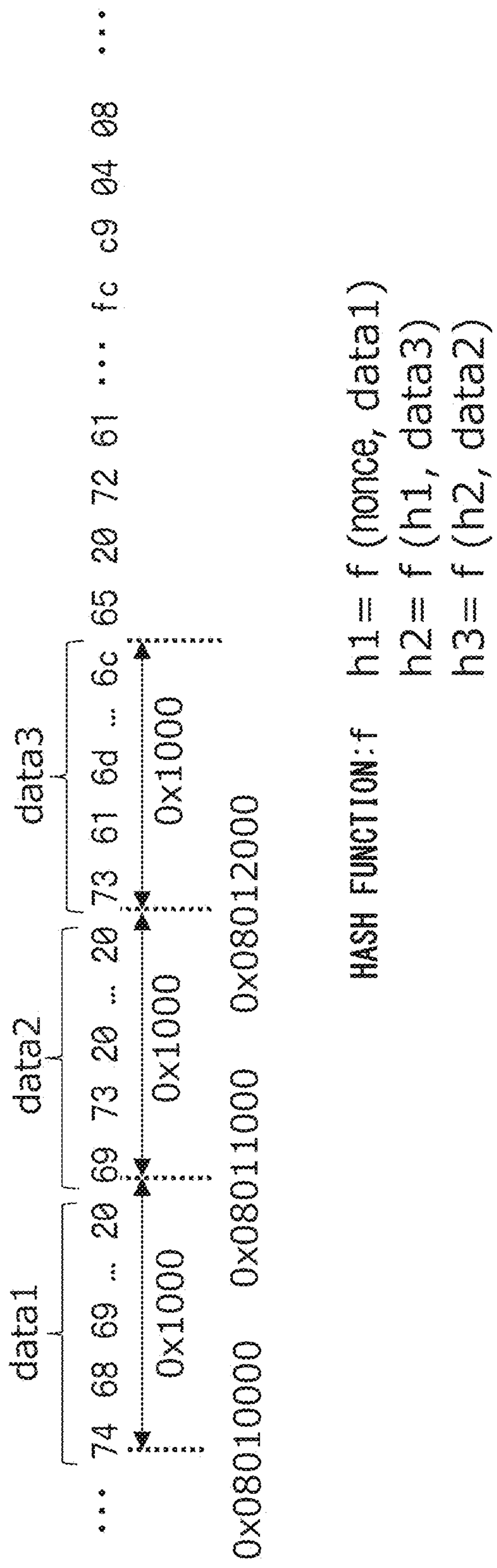

In FIG. 4B, data1 of the software placed in memory 109 has a start address of 0x08010000 (hexadecimal notation) and a size of 0x1000 (hexadecimal notation), data3 has a start address of 0x08012000 (hexadecimal notation) and a size of 0x1000 (hexadecimal notation), and data2 has a start address of 0x08011000 (hexadecimal notation) and a size of 0x1000 (hexadecimal notation). Therefore, based on the respective arguments, the measurement unit 106 reads the corresponding ranges of the software and calculates the respective hash values as follows:

$$h1 = f(nonce, data1)$$

$$h2 = f(h1, data3)$$

$$h3 = f(h2, data2)$$

(where f is a hash function).

Since the start address included in the measurement instruction is generated after the modification of the start position of the software in the verifier device 200 based on the placement information transmitted from the placement information transmission unit 104, the measurement region information is synchronized between the prover device 100 and the verifier device 200.

The start address may be included as the argument of the hash function.

The measurement result transmission unit 107 transmits the hash value calculated and obtained by the measurement unit 106 to the verifier device 200. In the case of FIG. 4A and FIG. 4B, the measurement result transmission unit 107 transmits the hash values h1, h2, and h3.

In addition to the hash value, a time when the hash value was obtained and error information indicating the address and size of the region to be measured for which measurement has failed may also be transmitted.

(Configuration of Verifier Device 200)

Figure 5:
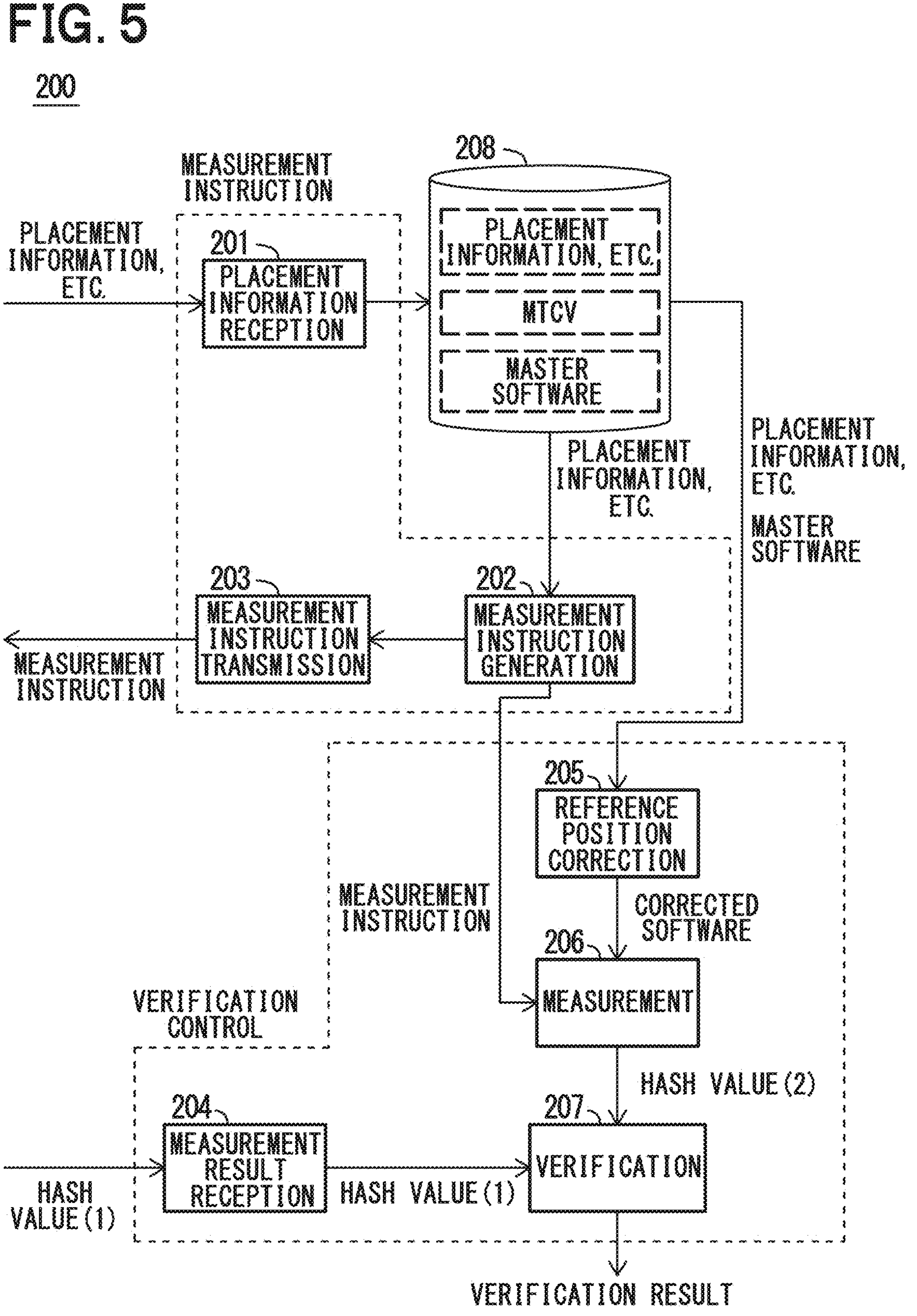
FIG. 5 is a block diagram illustrating a configuration example of a verifier device according to each of the first and second embodiments.

A configuration example of the verifier device 200 of the present embodiment will be described with reference to FIG. 5. The verifier device 200 includes a placement information reception unit 201, a measurement instruction generation unit 202, a measurement instruction transmission unit 203, a measurement result reception unit 204, a reference position correction unit 205, a measurement unit 206, a verification unit 207, and a storage unit 208.

The verifier device 200 can be divided into a measurement instruction unit related to an instruction to measure the software and a verification control unit related to the verification of the integrity of the software executed based on the measurement result of the software. In FIG. 5, the measurement instruction unit is a range including the placement information reception unit 201, the measurement instruction generation unit 202, and the measurement instruction transmission unit 203. The verification control unit is a range including the measurement result reception unit 204, the reference position correction unit 205, the measurement unit 206, and the verification unit 207.

In the storage unit 208, information regarding the program installed in the prover device 100 is stored in advance. A specific example of the information stored in the storage unit 208 will be described with reference to FIG. 6.

The storage unit 208 stores a contents identifier (Contents ID) that identifies software, a vehicle identifier (VIN) that can identify a vehicle in which the software is mounted, an identifier (ECU ID) of an ECU in which the software is mounted, an identifier (Program/Data ID) that identifies a program or data included in the software, and the software itself mounted in the prover device 100, that is, raw data of master software.

The placement information reception unit 201 receives, from the prover device 100, placement information indicating the position in the "memory" 109 of the prover device 100 at which the "software" executed by the prover device 100 is located. In addition to the placement information, the prover device 100 may transmit other necessary information (also referred to as placement information and the like), and the verifier device 200 may receive the placement information and the like.

A specific example of the information transmitted from the prover device 100 to the verifier device 200 and received by the verifier device 200 will be described with reference to FIG. 7. In the example of FIG. 7, the verifier device 200 receives the placement information and the like, including a contents identifier (Contents ID) that identifies the executed software, an allocation ID (Allocation ID) that identifies the transmitted placement information, a time (Timestamp) when the prover device 100 determined the placement information or when the prover device 100 transmitted the placement information, the placement information, and a trust chain value. In FIG. 7, the placement information is the start address of the program placed in the memory.

In addition to these pieces of information, the placement information and the like may include at least one of a vehicle identifier (VIN) that can identify the vehicle, an identifier (ECU ID) of the ECU in which the software is installed, an identifier (Program/Data ID) that identifies the program or data included in the executed software, a process identifier (PID), and a process name (Process Name).

The placement information reception unit 201 stores the placement information and the like in the storage unit 208. The placement information reception unit 201 desirably verifies that the received placement information and the like have been received from the correct prover device 100 and determines whether to store the placement information and the like in the storage unit 208 based on the verification result. For example, the master trust chain value (MTCV) of the prover device 100 may be stored in advance in the storage unit 208 of the verifier device 200, and the received placement information and the like may be stored in the storage unit 208 when the trust chain value included in the received placement information and the like matches the master trust chain value stored in the storage unit 208. Thereby, in the verifier device 200, it can be verified whether the prover device 100 has been booted normally, and only the placement information and the like transmitted from the normally booted prover device 100 can be stored in the storage unit 208.

When the prover device 100 transmits the software itself executed by the prover device 100 in addition to the placement information and the like, the placement information reception unit 201 may store the software itself in the storage unit 208 as the master software.

The measurement instruction generation unit 202 generates a measurement instruction that instructs the calculation of the "hash value" of the software to be executed by the prover device 100.

In the present embodiment, the measurement instruction includes "measurement region information" indicating a region to be measured in the software. For example, as in the example of FIG. 4A, the measurement instruction includes a nonce and a plurality of pieces of measurement region information (data1, data3, data2), and also includes measurement order information (data1, data3, data2) indicating an order in which the plurality of pieces of measurement region information are to be processed.

The address indicating the position of the software included in the measurement region information is generated after the start position of the software has been modified based on the placement information received by the placement information reception unit 201.

A specific example of the measurement instruction generated by the measurement instruction generation unit 202 will be described with reference to FIG. 8. In the example of FIG. 8, the measurement instruction includes an identifier (Request ID) of the measurement instruction, a time (Timestamp) when the measurement instruction generation unit 202 generates the measurement instruction or when the measurement instruction transmission unit 203 transmitted the measurement instruction, a contents identifier (Contents ID) that identifies the executed software, a nonce, and measurement region information (data1, data3, data2).

In addition, a vehicle identifier (VIN) that can identify the vehicle, an identifier (ECU ID) of the ECU in which the software is installed, and an identifier (Program/Data ID) that identifies the program or data included in the executed software may be included.

When a region to be measured is included, the region to be measured desirably includes important data related to confidentiality, integrity, and availability (collectively referred to as CIA). For example, the important data is data that is defined to be protected in terms of safety, financial, operational, and privacy (SFOP) considerations at the time of design. Techniques that compromise the CIA of important data include attack techniques derived by threat analysis at the time of design and attack techniques observed in the market at the time of operation.

Alternatively, the region to be measured may be a region that has potentially been falsified illegally.

The timing at which the measurement instruction generation unit 202 generates the measurement instruction is when the placement information is received from the prover device 100 or when the placement information is stored in the storage unit 208. In particular, when the prover device 100 actively transmits the placement information, that is, by a trigger from the prover device 100 itself or from a device other than the verifier device 200, there is a high possibility that the prover device 100 requires verification of the program. Therefore, it is desirable to generate the measurement instruction immediately after receiving the placement information.

The measurement instruction generation unit 202 may generate the measurement instruction at a different timing than when the placement information is received.

In this case, the timing at which the measurement instruction generation unit 202 generates the measurement instruction is desirably determined by the position where the verifier device 200 is provided.

In a case where the verifier device 200 is implemented by a server device installed outside the vehicle, the measurement instruction is generated, for example, when an abnormality caused by a cyberattack is determined in a vehicle security operation center (SOC) or when a product security incident response team (PSIRT) determines that integrity verification is necessary.

In a case where the verifier device 200 is provided inside the vehicle, for example, the measurement instruction is generated when a security sensor such as a host-based intrusion detection system (IDS) or a network-based intrusion detection system (IDS) detects an abnormality or when the in-vehicle SIEM has finished selecting an abnormality to be examined.

Other examples of the timing include every fixed cycle, when an ignition power supply is turned off, and when a power supply is turned off in an ECU of a specific group.

The measurement instruction transmission unit 203 transmits the measurement instruction generated by the measurement instruction generation unit 202 to the prover device 100. The timing at which the measurement instruction is transmitted is the timing at which the measurement instruction is output from the measurement instruction generation unit 202 to the measurement instruction transmission unit 203, but may not be immediately after the output of the measurement instruction.

The measurement result reception unit 204 receives a first hash value that is the response of the prover device 100 to the measurement instruction transmitted from the measurement instruction transmission unit 203. For example, when the prover device 100 obtained the hash values of FIG. 4B by calculation, these hash values h1, h2, h3 are the first hash values.

When the prover device 100 also transmits the time at which the first hash value was obtained and the error information, these pieces of information are also received.

A specific example of the information received by the measurement result reception unit 204 will be described with reference to FIG. 9. In the example of FIG. 9, the information received by the measurement result reception unit 204 includes an identifier (Result ID) of the measurement result, an identifier (Request ID) of the corresponding measurement instruction, a time (Timestamp) when the prover device 100 calculated or transmitted the first hash value, and hash values.

The reference position correction unit 205 reads the master software from the storage unit 208 and corrects the "reference position" included in the master software based on the placement information received by the placement information reception unit 201.

Since the processing in the reference position correction unit 205 is similar to the processing in the reference position correction unit 103 of the prover device 100, the description of the reference position correction unit 103 will be cited. As a result, the verifier device 200 can reproduce the same software as the software being executed by the prover device 100 and the placement of the software in the memory.

When the placement information reception unit 201 receives the software itself executed by the prover device 100 from the prover device 100, the reference position correction unit 205 does not need to correct the reference position.

The measurement unit 206 calculates a second hash value that is the hash value of the master software in which the reference position has been corrected by the reference position correction unit 205. The hash value is calculated based on the nonce and the measurement region information included in the measurement instruction generated by the measurement instruction generation unit 202. The calculation method is the same as that in FIG. 4B.

The verification unit 207 verifies whether the first hash value received by the measurement result reception unit 204 matches the second hash value calculated by the measurement unit 206. When the values match, it can be confirmed that the software being executed on the prover device 100 has not been falsified. When the values do not match, it can be confirmed that the software executed by the prover device 100 may have been falsified. The verification unit 207 outputs the verification result.

(Operations of Remote Attestation System 1)

Figure 10:
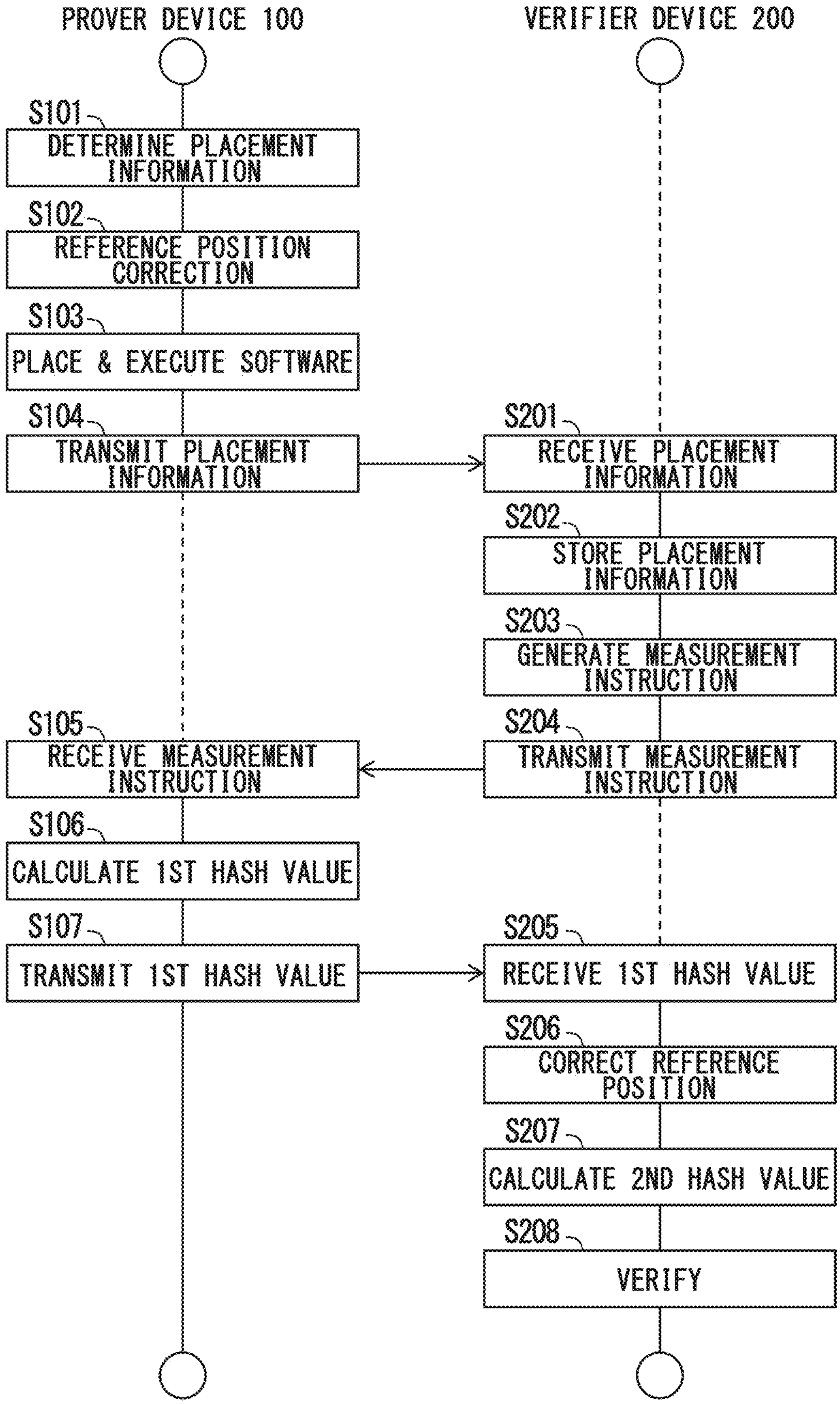
FIG. 10 is a flowchart for explaining operations of a remote attestation system according to each of the first and second embodiments.

The operations of the remote attestation system 1 will be described with reference to FIG. 10. The operations shown in FIG. 10 indicate the operations of both the prover device 100 and the verifier device 200 that constitute the remote attestation system 1. Furthermore, FIG. 10 shows a processing procedure for a proof program executable by the prover device 100, as well as a proof method executed by the prover device 100, and a processing procedure for a verification program executable by the verifier device 200, as well as a verification method executed by the verifier device 200. The processing described above is not limited to the order shown in FIG. 10. That is, the order may be interchanged as long as there are no restrictions, such as a relationship in which one step uses the results of its preceding step.

The placement position determination unit 102 of the prover device 100 determines placement information indicating a position in the memory at which the software is placed (S101).

Based on the placement information determined in S101, the reference position correction unit 103 corrects a reference position included in the software (S102).

Based on the placement information determined in S101, the launch processing unit 101 places the software, in which the reference position was corrected in S102, at the position in the memory and executes the software (S103).

The placement information transmission unit 104 transmits the placement information determined in S101 to the verifier device 200 (S104).

The placement information reception unit 201 of the verifier device 200 receives the placement information transmitted in S104 from the prover device 100 (S201).

The storage unit 208 stores the placement information received in S201 (S202).

The measurement instruction generation unit 202 generates a measurement instruction that instructs the calculation of the hash value of the software to be executed by the prover device 100 (S203).

The measurement instruction transmission unit 203 transmits the measurement instruction generated in S203 to the prover device 100 (S204).

The measurement instruction reception unit 105 of the prover device 100 receives the measurement instruction from the verifier device 200 (S105).

The measurement unit 106 reads the software placed in the memory and calculates a first hash value based on the measurement instruction received in S105 (S106).

The measurement result transmission unit 107 transmits the first hash value calculated in S106 to the verifier device 200 (S107).

The measurement result reception unit 204 of the verifier device 200 receives the first hash value that is a response to the measurement instruction transmitted in S204 (S205).

The reference position correction unit 205 reads the master software stored in the storage unit 208 and corrects the reference position included in the master software based on the placement information received in S201 (S206).

The measurement unit 206 calculates the second hash value of the master software in which the reference position was corrected in S205 (S207).

The verification unit 207 verifies whether the first hash value received in S205 matches the second hash value calculated in S207 (S208).

As described above, according to the remote attestation system 1 of the present embodiment, even after the memory layout has been randomized, remote attestation can be executed on a target required by the verifier.

Since the prover device 100 of the present embodiment transmits the placement information to the verifier device 200 prior to the calculation of the hash value by the measurement unit 106, the prover device 100 actively transmits the placement information. That is, the verifier device 200 can be caused to perform verification by transmitting the placement information when necessary from the perspective of the prover device 100.

By including the measurement region information in the measurement instruction, the verifier device 200 of the present embodiment can perform verification in the range of software required by the verifier device 200.

Second Embodiment

In the remote attestation system 1 of the first embodiment, the prover device 100 has actively transmitted placement information to the verifier device 200. That is, the prover device 100 has transmitted placement information not based on an instruction, information, or the like from the verifier device 200 but based on an instruction, information, or the like from the prover device 100 itself or from a device other than the verifier device 200.

In contrast, in the remote attestation system 1 of the present embodiment, the prover device 100 passively transmits the placement information to the verifier device 200. That is, the prover device 100 transmits the placement information based on an instruction, information, or the like from the verifier device 200.

The configuration of the prover device 100 of the present embodiment is the same as the configuration of the prover device 100 of FIG. 2, and will thus be described with reference to FIG. 2. The configuration of the verifier device 200 of the present embodiment is the same as the configuration of the verifier device 200 of FIG. 5, and will thus be described with reference to FIG. 5.

Hereinafter, the processing different from that of the first embodiment will be described, and the description and drawings of the first embodiment will be cited for the processing common to the first embodiment.

(Configuration of Prover Device 100)

The placement information transmission unit 104 transmits the placement information to the verifier device 200. In the present embodiment, the prover device 100 transmits the placement information passively, that is, by a trigger from the verifier device 200.

In the present embodiment, the placement information transmission unit 104 transmits the placement information to the verifier device 200 when the measurement instruction reception unit 105 receives the measurement instruction from the verifier device 200.

The measurement result transmission unit 107 transmits the hash value calculated and obtained by the measurement unit 106 to the verifier device 200.

In the present embodiment, the transmission of the placement information by the placement information transmission unit 104 does not necessarily have to be simultaneous with the transmission of the hash value by the measurement result transmission unit 107, but the transmission of the placement information and the transmission of the hash value are desirably performed in close proximity. The order of transmission may be the placement information first or the hash value first.

(Configuration of Verifier Device 200)

The timing at which the measurement instruction generation unit 202 generates the measurement instruction is arbitrary. That is, in the present embodiment, the verifier device 200 actively transmits the measurement instruction to the prover device 100, that is, by a trigger from the verifier device 200 itself or a device other than the prover device 100, so that the prover device 100 transmits the placement information to the verifier device 200. Therefore, the verifier device 200 may transmit the measurement instruction at the timing when verification needs to be performed.

For example, in a case where the verifier device 200 is implemented by a server device installed outside the vehicle, the measurement instruction is generated, for example, when an abnormality caused by a cyberattack is determined in a vehicle security operation center (SOC) or when a product security incident response team (PSIRT) determines that verification of integrity is necessary.

In a case where the verifier device 200 is provided inside the vehicle, for example, the measurement instruction is generated when a security sensor such as a host-based intrusion detection system (IDS) or a network-based intrusion detection system (IDS) detects an abnormality or when the in-vehicle SIEM has finished selecting an abnormality to be examined. Naturally, even in the case where the verifier device 200 is provided inside the vehicle, the measurement instruction can be generated by a trigger from the outside of the vehicle when a communication means is provided in the vehicle. For example, the above-described examples of the vehicle SOC and PSIRT also correspond to the case where the verifier device 200 is provided inside the vehicle.

Other examples of the timing include every fixed cycle, when an ignition power supply is turned off, and when a power supply is turned off in an ECU of a specific group.

(Operations of Remote Attestation System 1)

Since this is the same as FIG. 10, FIG. 10 and the description thereof will be cited.

As described above, according to the remote attestation system 1 of the present embodiment, even after the memory layout has been randomized, remote attestation can be executed on a target required by the verifier.

Since the prover device 100 of the present embodiment transmits the placement information to the verifier device 200 when the measurement instruction reception unit 105 receives the measurement instruction from the verifier device 200, the prover device 100 passively transmits the placement information. That is, the verifier device 200 can perform verification by transmitting the measurement instruction when necessary from the perspective of the verifier device 200.

By including the measurement region information in the measurement instruction, the verifier device 200 of the present embodiment can perform verification in the range of software required by the verifier device 200.

MODIFICATIONS

Modifications of the first and second embodiments will be described below.

(Contents of Placement Information)

In the first and second embodiments, the placement information transmitted by the placement information transmission unit 104 has been a start address (hereinafter referred to as a base address) indicating the leading position of the software. However, other information may be used as the placement information. The following are examples.

When the base address is calculated based on a predetermined algorithm using a seed value as an input, the seed value may be used as the placement information. In this case, it is not necessary to transmit the placement information until the seed value is changed by the prover device 100.

When the base address is calculated based on a predetermined algorithm using a seed value as an input and the seed value is a value that can be estimated, information serving as a hint may be used as the placement information. For example, when the seed value is a timestamp, the hint information may be any information that can identify which timestamp was used.

When the base address is not a common address in the process but the base address is individually set for each memory region, the base address for each memory region may be used as the placement information. In this case, although the number of pieces of information to be managed increases by the number of memory regions, it becomes easier to randomize the memory layout, and even if one base address leaks, the influence on other regions can be prevented from spreading.

When the base address is selected from a finite number of candidates, the identifier of the base address may be used as the placement information.

When the base address is selected from a finite number of candidates, the placement information transmission unit 104 may not transmit the placement information, and the verifier device 200 may transmit the measurement instruction a plurality of times. When there is a first hash value that matches the second hash value calculated by the verifier device 200 among the plurality of first hash values received from the prover device 100, or when the first hash value received from the prover device 100 matches one of the plurality of second hash values calculated by the verifier device 200, the integrity of the software may be considered as being verified. As a result, there is no need to transmit the placement information, so that it is possible to reduce the possibility of the leakage of the placement information.

There is a technique called delayed loading in which, when the prover device 100 executes software, a library is placed in the memory when the execution file first uses the library, rather than when the execution file is launched. As a result, the time required to launch the program can be shortened.

In the case of the delayed loading, the reference position correction unit 103 corrects the reference position not only when the program is launched but also when the library is placed. Therefore, in addition to the placement information described in the first and second embodiments, when the library is loaded, the placement information transmission unit 104 transmits the address where the library has been loaded and an identifier that identifies the loaded library to the verifier device 200 as the placement information. By using these pieces of information, the verifier device 200 can correct the reference position of the master software and calculate the second hash value of the master software after the correction.

(Protection of Placement Information)

The purpose of randomizing the position of the software in the memory is to mitigate the influence of memory destruction vulnerability. Thus, to prevent the placement information from being leaked and misused by an attacker, the placement information needs to be securely managed and shared between the prover device 100 and the verifier device 200. Therefore, it is desirable to encrypt the placement information at the time of storing or transmitting the placement information or to store the placement information in an isolated environment (i.e., a secure world). As an example of the latter, for example, by using a separation function such as a trusted execution environment (TEE) or a hypervisor to separate an execution environment in which a normal application operates and an environment in which the placement information is stored, the influence of the vulnerability can be avoided even when the execution environment in which the normal application operates is vulnerable. Alternatively, a physical separation may be performed using dedicated hardware, for example, a hardware security module (HSM). The verifier device itself may be disposed in an isolated environment to protect not only the placement information itself but also the processing that uses the placement information from attack.

(Content of Measurement Instruction)

The measurement instruction may be in any of a JavaScript Object Notation (JSON) format, a binary format, and a program code.

The measurement region information included in the measurement instruction may change the position, size, or order of the region to be calculated periodically or non-periodically.

Figure 11A:
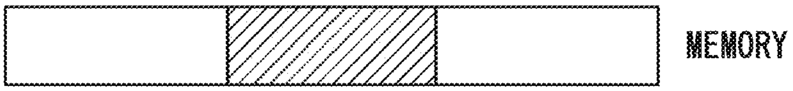
FIG. 11A to FIG. 11G are explanatory diagrams illustrating examples of changing measurement region information included in the measurement instruction.
Figure 11B:
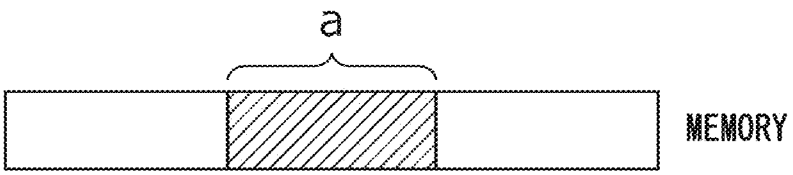
Figure 11C:
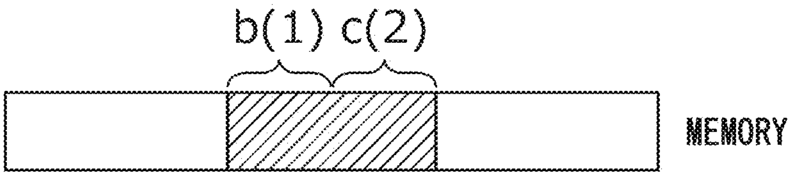
Figure 11D:
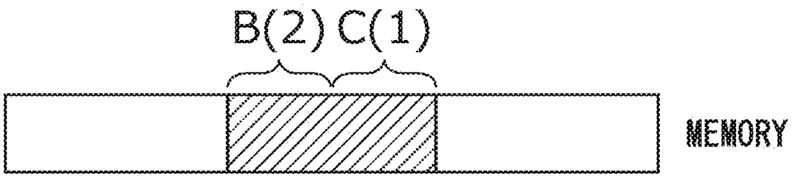
Figure 11E:
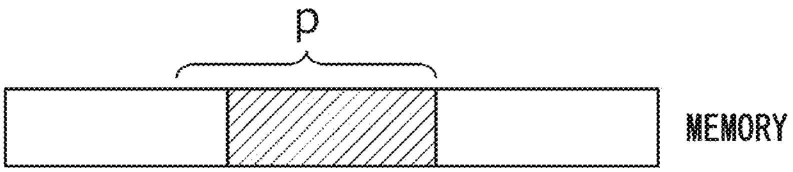
Figure 11F:
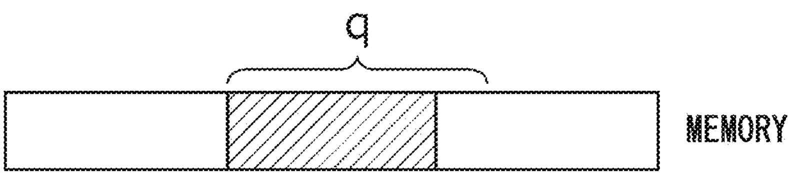
Figure 11G:
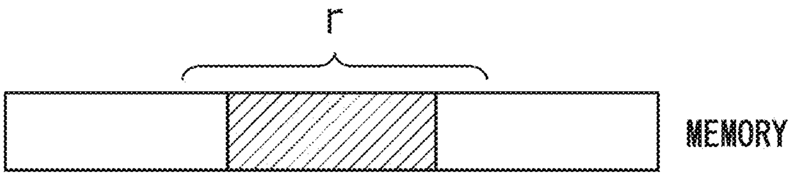

An example of changing the measurement region information included in the measurement instruction will be described with reference to FIG. 11A to FIG. 11G. In FIG. 11A, it is assumed that the shaded portion is a region in the memory to be measured. In this case, as shown in FIG. 11B, the region of a may be indicated as the measurement region information. However, as shown in FIG. 11C, the region of b and the region of c may be shown in this order, or as shown in FIG. 11D, the region of c and the region of b may be shown in this order. Moreover, the region of a may be indicated including an originally unnecessary region. For example, as shown in FIG. 11E, the start address may be set before the start address of the original region of a to indicate the region of p. As illustrated in FIG. 11F, the end address may be set after the end address of the original region of a to indicate the region of q. As illustrated in FIG. 11G, the start address may be set before the start address of the original region of a and the end address may be set after the end address of the original region of a to indicate the region of r. The designation of the p region, the q region, and the r region may be defined by the start address and size.

As described above, even in the case of indicating the same region, by changing the designation method periodically or non-periodically, it is possible to prevent the leakage of the placement information from the content of the measurement instruction or the behavior of the measurement unit 106.

(Disclosure of Method and Program)

Among the disclosures disclosed in the first and second embodiments, the disclosures belonging to the categories of the method and the program are shown below.

(Disclosure of Proof Method)

A proof method executed by a prover device that places and executes software in a memory, the proof method including:

- determining placement information indicating a position in the memory at which the software is placed (S101);
- correcting a reference position included in the software based on the placement information (S102);
- placing the software, in which the reference position has been corrected, at a position in the memory based on the placement information, and executing the software (S103);
- transmitting the placement information to a verifier device (S104);
- receiving a measurement instruction from the verifier device (S105);
- a measurement unit that reads the software placed in the memory and calculating a hash value, based on the measurement instruction (S106); and
- transmitting the hash value to the verifier device (S107).

(Disclosure of Verification Method)

A verification method executed by a verifier device that verifies integrity of software executed by a prover device, the verification method including:

- receiving, from the prover device, placement information indicating a position in a memory of the prover device at which the software is placed (S201);
- storing the received placement information (S202);
- generating a measurement instruction to instruct calculation of a hash value of the software executed by the prover device (S203);
- transmitting the measurement instruction to the prover device (S204);
- receiving a first hash value that is a response to the measurement instruction (S205);
- reading master software stored in the storage unit and correcting a reference position included in the master software based on the placement information (S206);
- calculating a second hash value of the master software in which the reference position has been corrected (S207); and
- verifying whether the first hash value matches the second hash value (S208).

(Disclosure of Proof Program)

A proof program executable by a prover device that places and executes software in a memory, the proof method including:

- determining placement information indicating a position in the memory at which the software is placed (S101);
- correcting a reference position included in the software based on the placement information (S102);
- placing the software, in which the reference position has been corrected, at a position in the memory based on the placement information, and executing the software (S103);
- transmitting the placement information to a verifier device (S104);
- receiving a measurement instruction from the verifier device (S105);
- a measurement unit that reads the software placed in the memory and calculating a hash value, based on the measurement instruction (S106); and
- transmitting the hash value to the verifier device (S107).

(Disclosure of Verification Program)

A verification program executable by a verifier device that verifies integrity of software executed by a prover device, the verification method including:

- receiving, from the prover device, placement information indicating a position in a memory of the prover device at which the software is placed (S201);
- storing the received placement information (S202);
- generating a measurement instruction to instruct calculation of a hash value of the software executed by the prover device (S203);
- transmitting the measurement instruction to the prover device (S204);
- receiving a first hash value that is a response to the measurement instruction (S205);
- reading master software stored in the storage unit and correcting a reference position included in the master software based on the placement information (S206);
- calculating a second hash value of the master software in which the reference position has been corrected (S207); and
- verifying whether the first hash value matches the second hash value (S208).

There have been described the features of a prover device, a verifier device, and a remote attestation system according to each embodiment of the present disclosure.

Since terms used in the embodiments are examples, the terms may be replaced with synonymous terms or terms including synonymous functions.

The block diagrams used for the description of the embodiments are obtained by classifying and organizing the configuration of each device for each function. The blocks representing the respective functions may be implemented by any combination of hardware or software. Since the blocks represent the functions, such a block diagram may also be understood as disclosures of a method and a program for implementing the method.

An order of functional blocks that can be understood as processes, flows, and methods described in the embodiments may be changed as long as there are no restrictions such as a relation in which results of preceding processes are used in one other process.

The terms such as first, second, to N-th (where N is an integer) used in the embodiments and in the disclosure are used to distinguish two or more similar configurations and methods and are not intended to limit the order or superiority.

Examples of forms of the devices of the present disclosure include the following forms.

Examples of component include a semiconductor element, an electronic circuit, a module, and a microcomputer.

Examples of semi-finished product include an electric control unit (ECU) and a system board.

Examples of finished product include a cellular phone, a smartphone, a tablet computer, a personal computer (PC), a workstation, and a server.

In addition, the device may include a device having a communication function or the like, and examples the device having a communication function may include a video camera, a still camera, and a car navigation system.

Necessary functions such as an antenna or a communication interface may be added to each device.

The present disclosure can be implemented not only by dedicated hardware having the configurations and functions described in the embodiments, but also by a combination of a program, which is recorded on a recording medium such as a memory or a hard disk and is used for implementing the present disclosure, and general-purpose hardware that has a dedicated or general-purpose CPU that can execute the program, a memory, and the like.

A program stored in a non-transitory tangible storage medium (for example, an external storage device (a hard disk, a USB memory, and a CD/BD) of dedicated or general-purpose hardware, or an internal storage device (a RAM, a ROM, and the like)) may also be provided to dedicated or general-purpose hardware via the storage medium or from a server via a communication line without using the storage medium. Thereby, the latest functions can be provided at all times through program upgrade.

Although the present disclosure mainly describes a case of an in-vehicle electronic control unit installed in a vehicle as a prover device, it may be applied to all moving mobile vehicles, such as motorcycles, ships, trains, and aircraft. Further, the present disclosure is applicable not only to mobile objects but also to general products including microcomputers.

What is claimed is:

1. A prover device that places software in a memory and executes the software, the prover device comprising:

at least one of (i) a circuit and (ii) a processor, with the memory storing computer program code executable by the processor, the at least one of the circuit and the processor configured to serve as:

a placement position determination unit that determines placement information indicating a position in the memory at which the software is placed;

a reference position correction unit that corrects a reference position included in the software based on the placement information, the reference position being a position in the memory that is referenced by the software during execution of the software;

a launch processing unit that places the software, in which the reference position has been corrected, at a position in the memory based on the placement information, and executes the software;

a placement information transmission unit that transmits the placement information to a verifier device;

a measurement instruction reception unit that receives a measurement instruction from the verifier device;

a measurement unit that reads the software placed in the memory and calculates a hash value, based on the measurement instruction; and a measurement result transmission unit that transmits the hash value to the verifier device.

2. The prover device according to claim 1, wherein the placement position determination unit randomly determines the position in the memory.

3. The prover device according to claim 1, wherein the placement information transmission unit transmits the placement information to the verifier device prior to a calculation of the hash value by the measurement unit.

4. The prover device according to claim 3, wherein the placement information transmission unit transmits the placement information to the verifier device in at least one of following cases:

when the software is launched;

when a security sensor connected to the prover device detects an abnormality;

when security information and event management (SIEM) connected to the prover device detects a cyber-attack; and when a power supply is turned off in devices or a system including the prover device.

5. The prover device according to claim 1, wherein the placement information transmission unit transmits the placement information to the verifier device when the measurement instruction reception unit receives the measurement instruction.

6. The prover device according to claim 1, wherein the measurement instruction includes measurement region information indicating a region to be measured in the software, and the measurement unit reads the software in a portion indicated by the measurement region information and calculates the hash value.

7. The prover device according to claim 6, wherein the measurement instruction includes a plurality of pieces of the measurement region information and measurement order information indicating an order in which a plurality of pieces of the measurement region information are to be processed.

8. The prover device according to claim 1, wherein the placement information transmission unit transmits, in addition to the placement information, a trust chain value that is a hash value of a program executed in a boot sequence of the prover device and a referenced setting file.

9. The prover device according to claim 1, wherein the prover device is an electronic control device mounted in a moving object.

10. A verifier device that verifies integrity of software executed by a prover device, the verifier device comprising:

at least one of (i) a circuit and (ii) a processor with a memory storing computer program code executable by the processor, the at least one of the circuit and the processor configured to serve as:

a placement information reception unit that receives, from the prover device, placement information indicating a position in a memory of the prover device at which the software is placed;

a storage unit that stores the placement information received;

a measurement instruction generation unit that generates a measurement instruction to instruct calculation of a hash value of the software executed by the prover device;

a measurement instruction transmission unit that transmits the measurement instruction to the prover device;

a measurement result reception unit that receives a first hash value that is a response to the measurement instruction;

a reference position correction unit that reads master software stored in the storage unit and corrects a reference position included in the master software based on the placement information, the reference position being a position in the memory of the prover device that is referenced by the software during execution of the software;

a measurement unit that calculates a second hash value of the master software in which the reference position has been corrected; and a verification unit that verifies whether the first hash value matches the second hash value.

11. The verifier device according to claim 10, wherein the measurement instruction includes measurement region information indicating a region to be measured in the software.

12. The verifier device according to claim 11, wherein the measurement instruction includes a plurality of pieces of the measurement region information and measurement order information indicating an order in which the plurality of pieces of the measurement region information are to be processed.

13. The verifier device according to claim 11, wherein the measurement region information included in the measurement instruction is changed periodically or non-periodically in a position, size, or order of a region to be measured.

14. The verifier device according to claim 10, wherein the measurement instruction includes a nonce that is used by the measurement unit and a measurement unit of the prover device.

15. The verifier device according to claim 10, wherein the measurement instruction generation unit generates the measurement instruction when the placement information is received from the prover device or when the placement information is stored in the storage unit.

16. The verifier device according to claim 10, wherein the measurement instruction generation unit generates the measurement instruction in at least one of the following cases:

when an abnormality caused by a cyberattack is determined in a vehicle security operation center;

when a product security incident response team determines that verification of integrity is necessary;

when a security sensor detects an abnormality;

when in-vehicle SIEM finishes selecting an abnormality to be examined;

when an ignition power supply is turned off; and when a power supply is turned off in an electric control unit (ECU) of a specific group.

17. The verifier device according to claim 10, wherein the placement information reception unit receives, in addition to the placement information, a trust chain value that is a hash value of a program executed in a boot sequence of the prover device and a referenced setting file.

18. The verifier device according to claim 17, wherein the placement information reception unit determines whether to store the placement information received, in the storage unit based on the trust chain value.

19. The verifier device according to claim 10, wherein the verifier device is an electronic control device mounted in a moving object.

20. The verifier device according to claim 10, wherein the verifier device is a server device installed outside a moving object.

21. A remote attestation system comprising a prover device and a verifier device, wherein the prover device places software in a memory and executes the software, the prover device including at least one of (i) a circuit and (ii) a processor, with the memory storing computer program code executable by the processor, the at least one of the circuit and the processor configured to serve as:

a placement position determination unit that determines placement information indicating a position in the memory at which the software is placed, a reference position correction unit that corrects a reference position included in the software based on the placement information, the reference position being a position in the memory of the prover device that is referenced by the software during execution of the software, a launch processing unit that places the software, in which the reference position has been corrected, at a position in the memory based on the placement information, and executes the software, a placement information transmission unit that transmits the placement information to a verifier device, a measurement instruction reception unit that receives a measurement instruction from the verifier device, a measurement unit that reads the software placed in the memory and calculates a first hash value, based on the measurement instruction, and a measurement result transmission unit that transmits the first hash value to the verifier device, and the verifier device is a verifier device that verifies integrity of software executed on the prover device, the verifier device including a placement information reception unit that receives the placement information from the prover device, a storage unit that stores the received placement information, a measurement instruction generation unit that generates the measurement instruction, a measurement instruction transmission unit that transmits the measurement instruction to the prover device, a measurement result reception unit that receives the first hash value, a reference position correction unit that reads master software stored in the storage unit and corrects a reference position included in the master software based on the placement information, a measurement unit that calculates a second hash value of the master software in which the reference position has been corrected, and a verification unit that verifies whether the first hash value matches the second hash value.

* * * * *